Figure 1:
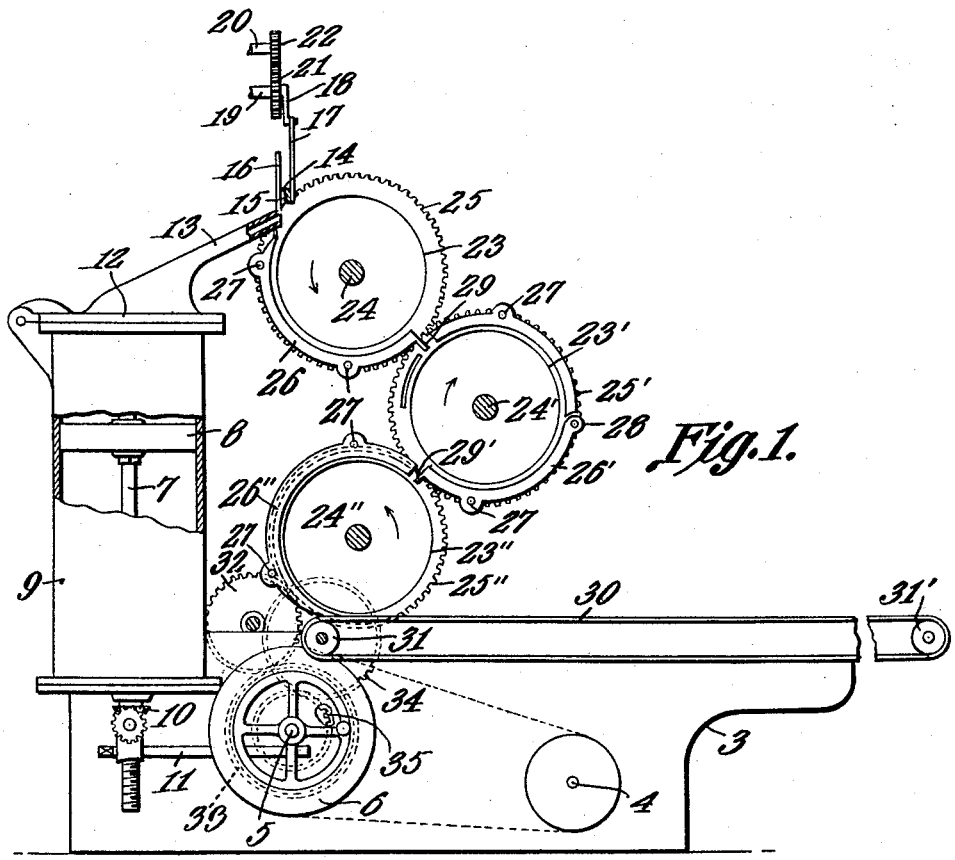

L. UHLER.
PRETZEL ROLLING MACHINE.
APPLICATION FILED JAN. 6, 1913.

1,116,766.

Patented Nov. 10, 1914.

Witnesses

Levi Uhler,
Inventor by C. A. Snow & Co.
Attorneys

UNITED STATES PATENT OFFICE.

LEVI UHLER, OF ALLENTOWN, PENNSYLVANIA.

PRETZEL-ROLLING MACHINE.

1,116,766.  Specification of Letters Patent.  Patented Nov. 10, 1914.

Application filed January 6, 1913. Serial No. 740,487.

*To all whom it may concern:*

Be it known that I, LEVI UHLER, a citizen of the United States, residing at Allentown, in the county of Lehigh and State of Pennsylvania, have invented a new and useful Pretzel-Rolling Machine, of which the following is a specification.

This invention relates to a machine or apparatus for rolling pretzels and the like or for rolling or fashioning pretzel blanks.

It is the object of the present invention to provide a novel and improved machine of this character which shall be operable to efficiently, conveniently and readily form the pretzel blank, and which machine shall be comparatively simple, compact and inexpensive in construction.

The present invention also contemplates the provision of a dough receptacle having a discharge tube communicating with a train or series of rolling cylinders and concaves coöperating therewith, in connection with means for discharging the dough through the said tube and means for intermittently severing the dough as it is discharged from the tube, so that the chunks or blocks of dough pass into the first concave, from whence they are rolled into proper form and then delivered to a conveyer to be thrown or bent into form.

It is also within the spirit of the invention to improve generally and increase the utility of devices of that character to which the present one appertains.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The preferred embodiment of the invention has been illustrated in the accompanying drawing, wherein similar reference characters have been employed to denote corresponding parts, and wherein:—

Figure 2:
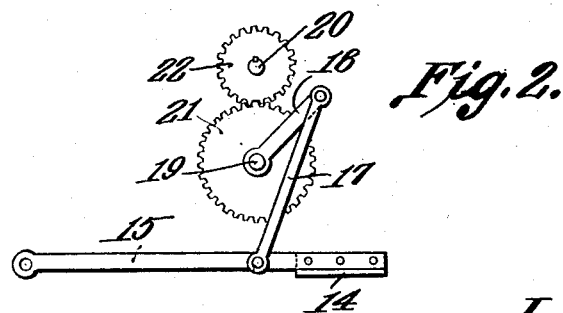

Figure 1 is a side elevation of the machine, parts being removed, parts being broken away and parts being shown in section, this figure being somewhat diagrammatic to disclose arbitrary or conventional structures. Fig. 2 is a detail of the dough cutter or knife and the actuating mechanism therefor.

Referring specifically to the drawing, there is employed in carrying out the present invention, a suitable base or frame 3 having a driving shaft 4 journaled therein, the driving shaft being actuated by a motor or prime mover of any suitable character. The driving shaft 4 is belted or otherwise operatably connected to a driven shaft 5 journaled in the frame, the shaft 4 being connected to the shaft 5 through the medium of a clutch 6 in order that the connection may be broken or interrupted as desired, or when it is necessary to stop the machine. The shaft 5, or counter shaft, is operatably connected to the lower end of a piston rod 7 attached at its upper end to a piston 8 working in a cylinder 9, the piston rod being preferably feathered through the lower end or bottom of the cylinder and having a bevel gear 10 screw threaded thereon below the cylinder and this gear in turn being operatably connected through the medium of the shaft 11 with the shaft 5. The details of this connection are within the scope of the mechanic or artisan and need not be illustrated nor described in detail. The essential feature is that the rotation of the shaft 5 shall impart a slow upward movement to the piston rod in order to elevate the piston.

The cylinder 9 is supported by the frame 3, it being noted that the actuating mechanism for the piston rod is located below the cylinder, and the cylinder is designed to hold the dough which is to be fashioned or rolled into the pretzel blanks. The top or cover 12 of the cylinder is preferably hinged thereto so that it may be swung open for readily receiving the dough, and is also provided with a goose neck or discharge tube 13. This goose neck or discharge tube directs the dough from the cylinder as the piston is forced upward, the dough being discharged from the delivery tube 13 in a circular or similar ribbon or tape. It is also understood that the cover or head 12 of the cylinder may be fastened to the cylinder in any desirable manner in order that when the machine is in use, there will be no liability of the cover being raised by the compression of the dough.

In order to properly sever the dough as it is discharged from the delivery tube 13, the cutter or knife 14 is movably mounted adjoining the end of the said tube and is given the proper shearing movement by the means presently described. This cutter or knife 14 is preferably secured to the free end of a pivoted arm 15 and is slidably mounted or arranged along the guide arm 16 upstanding from the free end of the tube 13, the arm 15 being connected by a link or pitman 17 to a crank 18 carried by a shaft 19. This shaft 19 is operatively connected to a shaft 20 through the medium of the respective intermeshing spur gears 21 and 22, these gears being designed to be interchanged with other like gears of various diameters in order that the speed or timing of the cutter or knife may be adjusted as necessary or desirable. The shaft 20 is driven in any suitable manner, preferably from the shaft 5 or any other part driven thereby, so that the cutter will be actuated simultaneously with the other parts of the machine, and as this connection is so obvious, it has not been illustrated. The rotation of the shaft 20 will necessarily rotate the shaft 19 at a ratio inversely proportional to the diameters of the gears, and as the crank 18 is revolved, the cutter will be given an oscillatory or reciprocatory movement along the guide 16 and over the end of the tube 13. The cutter will thus intermittently shear over or pass the end of the delivery tube and will sever the dough at timely intervals. The upward movement of the piston being regulated and being operated together with the cutter will cause the discharged dough to be cut into chunks or primary blanks of uniform weight, as is desirable, and by regulating the motion of the piston, or cutter, or both, the weight of the chunks or primary blanks of dough may be adjusted to a nicety, within practical limits. This is necessary where the weight of the pretzels or the like differ.

The chunks or primary blanks of dough are caught or received by a means for rolling the same, which consists in the following instrumentalities. A train or series of cylinders or drums 23, 23' and 23'' are mounted on the respective shafts 24, 24' and 24'', and are arranged in front of or adjacent the dough cylinder 9. These cylinders are arranged in a staggered relation or in various horizontal planes with their axes arranged in inclined planes relative to each other. The successive cylinders are rotated in reverse directions, or the alternate cylinders are rotated in the same direction, by means of the respective intermeshing gear wheels 25, 25' and 25'' secured to the shafts 24, 24' and 24''. The respective cylinders are also provided with the concaves 26, 26' and 26''. These concaves are provided with the ears or eyes 27 at their ends which are designed to be supported by adjustable carriers or bearings supported by the frame in order to properly position the concaves relative to the cylinders. The intermediate concave 26' is preferably constructed in two sections hinged together as at 28, it being noted that this concave extends throughout approximately three quarters of the circumference of the cylinder 23', or inclosing the cylinder 23' with the exception of the inner side. The concaves 26 and 26' are provided with the respective lips or flanges 29 and 29' at their lower edges, which lips are declined and extend to the respective cylinders 23' and 23''. The upper edges of the concaves 26'' and 26' extend contiguous to but are spaced from the respective lips 29' and 29. The axis of the shaft 24' lies approximately in the intersection of two planes inclined at angles of 45° and cutting the axes of the shafts 24 and 24'', the lips 29 and 29' lying in the said planes. In other words, the lower edge of the concave 26 extends beyond the bottom of the cylinder 23 to the plane of the axes of the shafts 24 and 24' and the lower edge of the concave 26' extends beyond or below the bottom of the cylinder 23' to the plane of the axes of the shafts 24' and 24'', the respective lips 29 and 29' projecting radially to the respective cylinders 23' and 23''. The respective cylinders and concaves are of such dimensions that the spaces therebetween are successively diminished from the upper cylinder to the lower one, so that the pretzel blanks will be gradually reduced to the proper diameter or size. The delivery tube 13 overhangs or terminates above the cylinder 23 and its concave, the concave 26 passing from below the cylinder 23 up the rear side thereof and no farther. The delivery end of the tube 13 is so positioned relative to the cylinder 23 and concave 26, that the chunks or primary blanks of dough will properly fall therebetween to be given their primary rolling or forming action. It is to be understood that the respective cylinders, the concaves, or both may be adjusted and changed for the purpose of regulating the spaces therebetween so as to permit of the reducing of the blank to the proper size or diameter according to the weight or quantity of the pretzel blank.

An endless conveyer belt or apron 30 is mounted upon the respective rear and forward rollers or guides 31 and 31' and its rear end is disposed below and contiguous to the bottom of the lowest cylinder 23'', the lower end of the concave 26'' terminating adjacent the conveyer 30, so that the pretzel blanks may pass readily from between the cylinder 23'' and the concave 26'' to the conveyer. This conveyer is propelled so that its upper run passes or moves forwardly, the roller 31 being operatively connected to the shaft 5 through the medium of respective intermeshing gears 34 and 35.

The cylinders are also operatively connected to the shaft 5 through the medium of an idle gear 32 meshing with the gear 25″ and meshing in turn with the gear 33 carried by the shaft 5.

In operation, it being understood that the suitable quantity and quality of dough has been inserted or placed in the dough cylinder or receptacle 9, as the shaft 5 is driven the piston 9 will be gradually forced upward so as to discharge the dough through the delivery tube 13. The discharged dough is then cut up into chunks or blanks of the proper weight by the cutter 14 as above indicated, and these chunks drop into the space between the upper or first cylinder 23 and concave 26. The chunk is then given a rolling motion between the said cylinder and concave so as to assume a circular form, and at the same time is carried toward the lower edge of the concave, from whence it is freed from between the concave and cylinder aforesaid and is delivered or dropped over the lip 29 to the next succeeding or second cylinder 23′. The upper edge of the concave 26′ in extending contiguous to the lip 29 will immediately receive the blank so that the blank will be subject to a second rolling action, but in a reverse direction, to further reduce the diameter of the blank and increase the form and proportion of the blank. The blank then approaches the lower edge of the concave 26′ and gravitates over the lip 29′ to the last or third cylinder 23″, and is given its final rolling action between the cylinder 23″ and the concave 26″. The blank in passing from the last cylinder and concave is of proper form and proportions and drops onto the convey 30. The conveyer feeds the blanks, as they drop from the forming cylinders and concaves, forwardly so that they may be picked up by the operator or operators for throwing or forming them into the pretzels proper.

With the machine and operation as above described, it will be noted that the pretzel blanks may be efficiently, conveniently and readily formed from a batch or bulk of dough, and with a marked degree of uniformity. The present machine is also adapted for rolling pretzel blanks of various weights or sizes, and is otherwise advantageous as will be apparent from the foregoing.

Numerous alterations or modifications are possible in the present machine, as for instance, more than one cylinder 9 may be provided, so that the pretzel blanks may be rolled in multiple, or other equivalent means may be employed for actuating the cutter 14 and for permitting of its timed movement.

What is claimed is:—

In a dough rolling machine, a pair of oppositely rotating parallel dough rolling cylinders having their axes disposed horizontally in different horizontal and vertical planes, a concave for each cylinder, the coöperating cylinders and concaves being arranged to roll dough therebetween, the space between lower cylinder and concave being less throughout its entire length than the space between the upper cylinder and concave, the upper concave extending below the upper cylinder and having its delivery edge terminating in the plane cutting the axes of the two cylinders and provided with a declined lip extending to the lower cylinder, the lower concave extending over the lower cylinder and having its receiving end terminating adjoining the said lip, the space between the lip and receiving end of the lower concave being narrow whereby the dough blanks delivered over the said lip will immediately be taken up under the lower concave by the lower cylinder.

In testimony that I claim the foregoing as my own, I have hereto affixed my signature in the presence of two witnesses.

LEVI UHLER.

Witnesses:
 CHAS. H. SIBBACH,
 CHAS. H. UHLER.